Aug. 18, 1959 R. B. MATTHEWS 2,899,972
FLUID PRESSURE OPERATED CONTROL DEVICES
Filed March 29, 1956
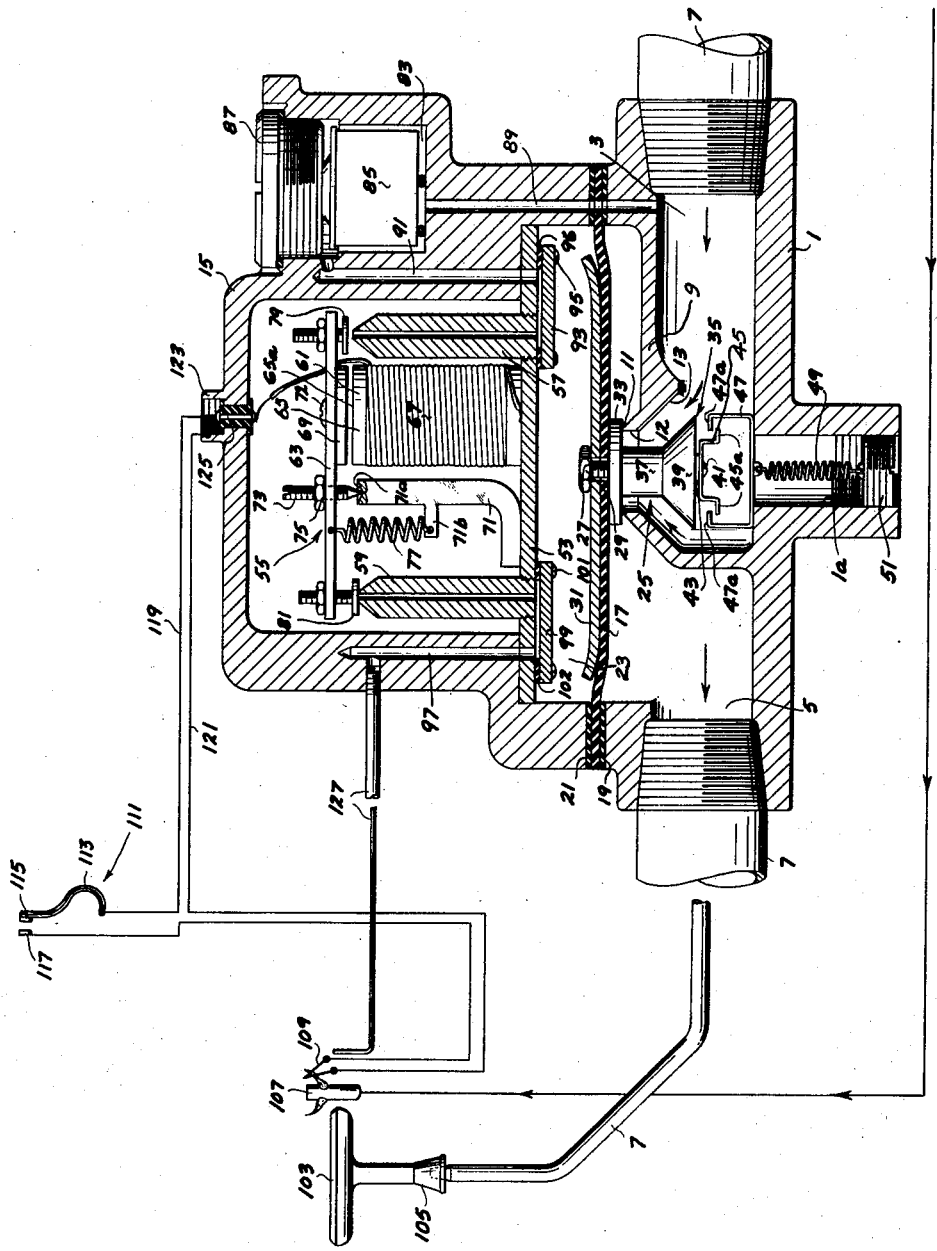
INVENTOR.
Russell B. Matthews.
BY
Seegert & Schwalbach
ATTORNEYS United States Patent Office 2,899,972
Patented Aug. 18, 1959

2,899,972
FLUID PRESSURE OPERATED CONTROL DEVICES

Russell B. Matthews, Wauwatosa, Wis., assignor to Baso Inc., Milwaukee, Wis., a corporation of Wisconsin Application March 29, 1956, Serial No. 574,781

13 Claims. (Cl. 137—495)

The present invention pertains to fluid pressure-operated control devices and more particularly to fluid flow control valves of the type which is not only operable to permit or prevent fluid flow, but is also operable whenever flow is permitted to maintain the fluid pressure at the outlet thereof at a predetermined level in spite of substantial changes in fluid pressure at the inlet thereof.

In supplying fluid fuel to certain fuel burning apparatus, it has been found desirable, if not necessary, to provide in addition to valve means for selectively turning off and on the fluid flow, pressure regulating means for maintaining the pressure of the fluid fuel supplied to the apparatus at a predetermined level. Such pressure regulation of fuel flow is necessary if it is desired to maintain substantially constant the amount of heat afforded by the main fuel burner of the apparatus despite substantial variations and fluctuations in the pressure of the fluid fuel as received from the source. Heretofore, it has been necessary to employ a separate device in the supply conduit to perform the pressure regulating function. This device, of course, was in addition to the usual on-off valve, and therefore presented certain short comings, the more prominent of which, perhaps, was that the cost entailed in providing separate housings and duplicate operating parts for each of the on-off valve and the regulator became significant to the point where the regulator was purposely omitted. Further, the cumbersome arrangement resulting from connecting several valve housings in series relation in the fuel supply conduit made certain fuel burning apparatus undesirable for installation in closely confined areas, again causing the regulator to be omitted.

With these disadvantages foremost in mind, the present invention was devised to utilize a single valve body for housing both the on-off valve and the pressure regulator. More specifically, a single unit having a single valve housing and a unitary flow control means has been devised to provide both functions, namely, on-off control and pressure regulation of the fuel flow to a burner. Further, it was made certain that the single flow control means was responsive to unsafe conditions so as to provide automatic shut-off for obvious reasons of safety, and responsive to thermostatic conditions in order to maintain a predetermined temperature within the space being heated.

It is therefore an object of the present invention to provide a single flow control device which provides both on-off control and pressure regulation control of fluid fuel flow to a main burner.

It is also an object of this invention to provide a flow control device which utilizes a unitary valve means for providing both pressure regulation and on-off control of the fuel.

Another object is to provide a novel combination control device including a pressure operated valve of the diaphragm type wherein fluid pressure is employed to move a valve member between flow-permitting and flow-preventing positions, and also including means which affords regulation of the pressure of the fluid as it leaves the control device.

It is also an object of this invention to utilize in a diaphragm valve having bleed port operating means, a unitary flow control member comprising a first portion movable by actuation of said operating means between flow-permitting and flow-preventing positions and a second portion which is operated between a plurality of flow-permitting positions by the pressure at the outlet of the diaphragm valve to provide pressure regulation.

Another object of this invention is to provide a pressure operated flow control device of the aforementioned character having means associated with each of said first and second portions to permit the first portion to move from flow-preventing position to full-on flow-permitting position to permit sufficient fuel flow to the main burner for safe ignition thereof prior to commencement of any pressure regulating action tending to reduce such fuel flow.

Another object is to provide a pressure operated flow control device of the class described having an arrangement of parts such that the valve member is returned to its flow-preventing position with snap action movement whenever the valve member tends to move closer than a predetermined safe minimum distance of its valve seat, thereby preventing fuel flow to the main burner at a rate which is insufficient for safe burning thereat.

Another object of the present invention is to provide a flow control device as characterized above which is simple in construction and operation, and less expensive to manufacture than devices heretofore employed.

The novel features which I consider characteristic of my invention are set forth with particularity in the appended claims. The device itself, however, both as to its organization and mode of operation, together with additional objects and advantages thereof, will best be understood from the following description of a specific embodiment when read in connection with the accompanying drawing, in which the single figure is a center line vertical sectional view of one illustrative example of the present invention shown, more or less schematically, connected to certain elements of fluid fuel burning apparatus.

Referring to the drawing, the embodiment of the invention selected for illustration comprises a valve body or control body 1 formed with an inlet chamber 3 and an outlet chamber 5 connected to contiguous sections of a main burner fuel supply conduit 7. A partition wall 9 is formed in body 1 for separation of inlet 3 and outlet 5 and comprises valve seat means including a valve seat 11 affording a control port 12 and a bevelled or frustoconically shaped fluid flow control surface 13.

A valve operator housing 15 is fixed to control body 1 over an opening in the upper wall thereof, there being a movable partition or flexible diaphragm 17 fixed therebetween about its marginal edge. Sealing means such as gaskets 19 and 21 are installed on opposite sides of the marginal edge of diaphragm 17 to prevent escape of fluid fuel. Such positioning of diaphragm 17 provides a pressure chamber 23 on the side thereof within housing 15 while the other side thereof is exposed to the fluid pressure at outlet 5.

A flow control means 25 comprises a first flow control portion or valve disc 33, and a back-up plate 31 overlies the diaphragm 17 within pressure chamber 23. The valve disc 33, diaphragm 17 and back-up plate 31 are clamped together as by means of an externally threaded stud 27 and a nut 29. The back-up plate 31 functions as a stiffening member for the diaphragm and as a biasing weight for purposes to be hereinafter set forth. Plate 31 also serves to define the effective area of diaphragm 17 as is well understood in the art.

Flow control means 25 also comprises a second flow control portion 35 formed with a cylindrical portion 37 and a conically shaped portion 39 having a bevelled surface formed complementally of bevelled surface 13 of the valve seat means formed in partition wall 9 for cooperation therewith to meter fluid flow from inlet 3 to outlet 5. Valve disc 33 cooperates with valve seat 11 to permit or prevent fluid flow between said inlet 3 and outlet 5.

Fixed to the flared or enlarged end of flow control portion 39, by means such as screw 41 and washer 43, is a bracket 45 having outwardly extending arms 45a. Another bracket 47 having inwardly extending arms 47a for engagement with ears 45a is biased against valve body 1 within inlet chamber 3 as shown in the drawing by a helical tension spring 49 having one of its ends attached to bracket 47 and the other of its ends fixed to an adjusting screw 51. Adjusting screw 51 is formed with a notch or kerf for receipt of the engaging end of a screw driver to facilitate, by rotation of said screw, adjustment of the biasing effect of spring 49 on bracket 47. As shown, the adjusting screw 51 is threaded into an opening 1a formed in control body 1 and in which the spring 49 is positioned.

Positioned within operator housing 15 on mounting member 53, is a valve operator 55 comprising tubular bleed port members 57 and 59 threaded through suitable openings in the member 53, an electromagnet 61, and an operating lever 63 carrying an armature 69 and a pair of valve members 79 and 81 cooperable with the bleed port members 57 and 59. Electromagnet 61 comprises a core member 65 which may be U-shaped and formed with a pair of pole faces 65a, and an electromagnet winding 67. Core member 65 is fixed to the mounting member 53 in any well known manner, and the armature 69 is fixed to operating lever 63, as by means such as screw 72, in a position to cooperate with the pole faces 65a of the electromagnet 61.

Operating lever 63 is pivotally mounted on a bracket 71 by means of a pivot screw 73 threadably inserted within an opening formed in lever 63, there being a lock nut 75 for cooperation with screw 73 and lever 63 to retain said screw in any desired position relative to lever 63. One end of pivot screw 73 is formed with a screw driver kerf to facilitate adjustment of said screw, while the other end thereof is formed with a taper to provide a pivot point for cooperation with a dished or cup-shaped end portion or fulcrum 71a formed in a bracket 71 fixed to the mounting member 53.

A helical tension spring 77 is connected at its opposite ends to an extent 71b of bracket 71 and to the operating lever 63 for biasing the latter in a counterclockwise direction about fulcrum 71a as viewed in the drawing, to thereby bias the valve member 81 toward flow-preventing position with respect to the bleed port member 59 and the valve member 79 toward flow-permitting position with respect to the bleed port member 57. The valve members 79 and 81 are adjustably fixed to the operating lever 63, each being carried by an adjusting screw threadably mounted in lever 63 and held in a selected fixed relation with respect thereto by a lock nut.

Operator housing 15 is also formed with a filter chamber 83 wherein a filter 85 is held in operative position by a nut 87. A fluid passage 89 is provided between inlet chamber 3 and filter chamber 83 through openings formed in control body 1, gaskets 19 and 21, diaphragm 17 and operator housing 15. A passageway 91 is provided by openings formed in housing 15 and mounting member 53 and cooperates with a plate or conduit member 93 which is sealingly fixed in spaced relation to mounting member 53 by means of screws 95 and gasket 96 to afford communication between passageway 91 and the through opening of tubular bleed port member 57. A bleed passage 97 is formed in housing 15 and is afforded communication with the through opening of bleed port member 59 by means of a plate or conduit member 99 sealingly fixed in spaced relation to mounting member 53 by means such as screws 101 and gasket 102.

As shown in the drawing, conduit 7 affords fuel supply to a main burner 103 through a mixing chamber 105. A pilot burner 107, juxtaposed with respect to the main burner for ignition thereof, is supplied with fluid fuel through means separate from or independent of the subject fluid pressure operated control device as schematically shown in the drawing. Positioned adjacent pilot burner 107 for heating thereby, is a thermoelectric generator or thermocouple 109 connected in circuit with a condition responsive switch or thermostat 111, shown in the drawing as comprising a bi-metal element 113 carrying a movable low resistance contact 115 for cooperation with a stationary low resistance contact 117, said bi-metal element being deformable in response to variation in heating thereof for making or breaking engagement of contacts 115 and 117 as is well understood in the art. It is to be understood that the present invention is not to be limited to the use of the particular condition responsive means 111 shown in the drawing. Said means may also comprise a thermostat the low resistance electrical contacts of which are encapsulated within an expansible and contractible hermetically sealed enclosure containing a subatmospheric expansible and contractible volatile fluid fill, as generally preferred for use in low power circuits, such as those powered by a thermoelectric generator.

The circuit of thermoelectric generator 109 includes lead wires 119 and 121 which may be arranged in coaxial fashion and adapted with a lead connector for threaded engagement with connecting means 123 formed in operator housing 15. Such connector affords grounding of lead wire 121 to housing 15 and affords connection of lead wire 119 to a terminal member 125 which is insulatedly mounted in housing 15. One end of electromagnet winding 67 is connected to terminal 125 while the other end thereof is grounded to housing 15 as by connection thereof to mounting member 53, thus completing the energizing circuit for said winding 67 from thermocouple 109 through thermostat 111 and housing 15.

Mounted in communication with passageway 97 is a bleed conduit 127 having its free end positioned adjacent pilot burner 107 for burning of bleed fuel as will hereinafter appear.

The embodiment of the invention shown in the drawing operates as follows:

With pilot burner 107 ignited and thermostat 11 satisfied (contacts 115 and 117 disengaged), the parts of the subject control device are positioned as shown in the drawing, namely, with valve member 81 in flow-preventing engagement with bleed port member 59, valve member 79 in flow-permitting relation to bleed port member 57 and armature member 69 in retracted position due to the biasing effect of spring 77 on lever 63. Such relationship permits fluid to flow from inlet chamber 3 through passageway 89, filter 85, passageway 91, and the through opening of bleed port member 57 to pressure chamber 23. Since such fluid is prevented from leaving chamber 23, the fluid pressure therewithin soon reaches the fluid pressure within inlet chamber 3. The pressure within chamber 23 aids the biasing force afforded by the weight of the back-up plate 31 and control means 25 in exerting a downward force on the valve member 33, while the pressure within inlet chamber 3 exerts an upward force against various of the parts of flow control means 25 urging valve member 33 toward flow-permitting position. However, since the effective area of back-up plate 31 is considerably larger than the effective area of the various parts of flow control means 25, and since the same fluid pressure (force per unit area) exists within chambers 3 and 23, valve disc 33 is retained in its flow-preventing position in engagement with valve seat 11. It has been found desirable to have the effective area of back-up plate 31 approximately seven times larger than the aforementioned effective area of flow control means 25 to provide a very substantial force for retaining valve disc 33 in its flow-preventing position.

Heating of the hot junction of thermocouple 109 affords electrical energy for energization of electromagnet winding 67 whenever thermostat 111 calls for heat by engagement of contacts 115 and 117. Energization of winding 67 causes armature member 69 to be attracted toward core member 65 and operating lever 63 to be pivoted against the biasing force of spring 77 in a clockwise direction about fulcrum 71a. Such movement of operating lever 63 causes valve member 79 to be moved to flow-preventing position with respect to bleed port member 57 and valve member 81 to be moved to flow-permitting position relative to bleed port member 59. Such movement of valve member 79 interrupts communication between pressure chamber 23 and inlet chamber 3, whereas such movement of valve member 81 affords communication between pressure chamber 23 and the surrounding atmosphere to permit bleeding of fluid from within said chamber 23. The fluid thus bled, flows through bleed port member 59, passageway 97 and conduit 127, and is ignited by the flame of pilot burner 107.

Such bleeding decreases the fluid pressure within chamber 23 and thereby the downward force exerted on the valve member 33 to the point where the force created by the fluid pressure within inlet chamber 3 on the under side of the various parts of flow control means 25 overcomes the force exerted by the fluid pressure on the upper side of back-up plate 31 and the biasing effect of the weight of said control means 25 to effect movement of valve disc 33 to flow-permitting position relative to valve seat 11. Fluid fuel is thus permitted to flow from inlet chamber 3 through control port 12, outlet chamber 5 and conduit 7 to main burner 103 where it is ignited by the flame of pilot burner 107.

As will be readily understood by those persons skilled in the art, as soon as valve disc 33 is initially moved or "cracked" away from its valve seat 11, fluid fuel from inlet 3 rushes between valve disc 33 and seat 11 to exert a force on the underside of diaphragm 17. The various parts are so arranged that following such predetermined initial movement of valve disc 33 from its flow-preventing position, arms 45a of bracket 45 engage arms 47a of bracket 47, so that further movement of flow control means 25 lifts bracket 47 against the biasing force of spring 49. Since the effective area of diaphragm 17 is considerably greater than the effective area of flow control means 25, the force urging valve disc 33 toward flow-permitting position overcomes the biasing force of spring 49, whereupon diaphragm 17 is moved upwardly and carries with it flow control means 25 and brackets 45 and 47 to effect movement of valve disc 33 from its flow-preventing position to full on flow-permitting position. Thus, sufficient fuel flow to main burner 103 for safe ignition thereof.

It will be noted that flow control means 25 is so arranged that when valve disc 33 is in its full on flow-permitting position, the amount of fluid permitted to flow from inlet 3 to outlet 5 is governed by the size of the opening between cylindrical portion 37 of said control means and the wall of control port 12. Thus, the present invention contemplates the use of a cylindrical portion 37 of length sufficient to permit valve disc 33 to be moved far enough from its valve seat 11 so that the spacing between the valve seat 11 and said valve disc 33 affords no more restriction to the flow of fuel than does the spacing between the cylindrical portion 37 and the wall of port 12. This arrangement insures maximum fuel flow for ignition of main burner 103 prior to diminution thereof for metering purposes to be described later.

It will be seen that as soon as valve disc 33 moves to its flow-permitting position and sufficient resistance to fluid flow is afforded by conduit 7, the pressure within outlet chamber 5 increases. Since the fluid pressure within outlet chamber 5 is exposed to the underside of diaphragm 17, it exerts a force which urges flow control means 25 in upward direction as viewed in the drawing. Such movement of flow control means 25 causes the bevelled surface of flow control portion 39 to approach surface 13 of partition wall 9 to decrease the flow of fluid from inlet 3 to outlet 5.

It is thus seen that as the pressure increases within outlet chamber 5, for example as a result of an increase in the inlet line pressure, flow control means 25 is moved upwardly to cause bevelled portion 39 to decrease fluid flow between inlet 3 and outlet 5 and thereby to decrease the pressure within outlet chamber 5. A point is finally reached where the effect of outlet pressure tending to move flow control means 25 in an upwardly direction is balanced by the downward force created by the weight of the several parts and by the force of biasing spring 49, whereupon flow control means 25 comes to rest to afford flow of a constant amount of fluid fuel from inlet chamber 3 to outlet chamber 5.

Should the fluid pressure within outlet chamber 5 suddenly increase or decrease as by variation in the supply line pressure, such increase or decrease will move flow control means 25 to establish a new relationship between bevelled portion 39 and surface 13, so as to return the outlet pressure to that for which the control device has been set by adjustment of the screw 51. Thus, the fluid pressure within outlet chamber 5 is maintained constant regardless of variations in pressure within inlet chamber 3.

Should it be desired to change the pressure of the fluid at outlet 5, it is merely necessary to change the biasing force of spring 49 on bracket 47 by changing the position of adjusting screw 51 within opening 1a of valve body 1.

Upon interruption of the flow of energizing current to electromagnet winding 67, as by disengagement of the thermostat contacts 115 and 117 or by cooling of the hot junction of thermocouple 109 due to extinguishment, accidental or otherwise, of the flame at pilot burner 107, tension spring 77 effects pivotal movement of operating lever 63 in a counterclockwise direction about fulcrum 71a, thereby returning valve member 81 to its flow-preventing position relative to bleed port member 59 and valve member 79 to its flow-permitting position with respect to bleed port member 57. Closure of valve member 81 prevents bleeding of fuel from within pressure chamber 23 while opening of valve member 79 permits transmission of the fluid pressure at inlet 3 to pressure chamber 23 through passageway 89, filter 85, passageway 91, and the through opening of bleed port member 57. Since there is always a pressure difference between inlet 3 and outlet 5 due to pressure drop through control port 12, the pressure within pressure chamber 23, and the weight of the back-up plate 31 and valve means 25 overcomes the pressure within outlet chamber 5 and cause flow control means 25 to move in a downwardly direction.

As flow control means 25 moves downwardly, a sequence of operations takes place, first causing control of fluid flow from inlet 3 to outlet 5 to be returned to valve disc 33, since upon downward movement of control means 25, flow control portion 39 and surface 13 afford less restriction to the flow of fuel between the inlet and outlet than does said valve disc. Further, as valve disc 33 approaches valve seat 11 it decreases the fluid flow, thereby increasing the pressure drop through port 12 to effect a decrease in the fluid pressure within outlet chamber 5 and an increase in the pressure difference between outlet chamber 5 and pressure chamber 23. Such increase in the pressure differential causes valve disc 33 to move closer to valve seat 11 so that the pressure differential again increases. This sequence repeats itself many times within a very short period of time so that valve disc 33 is substantially instantaneously moved to its flow-preventing position. Final movement of disc 33 into engagement with valve seat 11 causes bracket 47 to be seated against valve body 1 under the force of tension spring 49, thereby effecting disengagement of arms 45a of bracket 45 and arms 47a of bracket 47. Thus, fuel flow to main burner 103 is substantially instantaneously interrupted to prevent supplying insufficient fuel for safe burning at main burner 103.

It is thus seen that the present invention affords a device having a unitary valve means which substantially instantaneously moves from its flow-preventing position to a full on flow-permitting position to afford safe ignition of the main burner, and substantially instantaneously interrupts fuel flow by rapid movement from a safe flow-permitting toward flow-preventing position to assure, when fuel flows, that it is sufficient in quantity for safe burning at the main burner. Also, such device affords metering of the fuel supplied to the main burner so as to maintain the pressure thereof constant in spite of substantial fluctuations in the supply line pressure. The subject invention also permits such device to be rendered responsive to unsafe conditions and thermostatic conditions for effecting proper control of the flame at the main burner.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In a fluid flow control device, in combination, a valve member having flow-permitting and flow-preventing positions, a metering valve movable with said valve member and having a first position permitting full fuel flow therepast and movable in a flow-decreasing direction, fluid pressure operated actuating means for said valve member and metering valve, movement of said valve member from its flow-preventing to a first flow-permitting position permitting full fuel flow, and further movement of said valve member in the same direction effecting movement of said metering valve in a flow decreasing direction from said first position toward a second position affording reduced fuel flow, and biasing means having a lost motion connection with said valve member rendered operative by predetermined movement of said valve member from its flow-preventing position and effective to oppose said further movement of said valve member and movement of said metering valve from its first toward its second position.

2. In a fluid flow control device, in combination, a valve member having flow-permitting and flow-preventing positions, a metering valve connected for movement with said valve member and having a first position permitting full fuel flow therepast and movable in a flow-decreasing direction, fluid pressure operated actuating means for said valve member and metering valve, movement of said valve member from its flow-preventing to a first flow-permitting position permitting full fuel flow, further movement of said valve member in the same direction effecting movement of said metering valve in a flow decreasing direction from said first position to a second position affording reduced fuel flow, adjustable biasing means, and a lost motion connection between said biasing means and said valve member and metering valve operable upon predetermined movement of said valve member from its flow-preventing position and operable to cause said biasing means to oppose said further movement of said valve member and movement of said metering valve from its first toward its sectioned position, adjustment of said biasing means varying the opposition afforded by the latter to said flow decreasing movement of said metering valve.

3. In a pressure operated fluid flow control device, in combination, a control body having an inlet chamber and an outlet chamber, flow control means in said body having a first flow control portion movable between flow-permitting and flow-preventing positions for control of fluid flow from said inlet chamber to said outlet chamber and a second flow control portion movable with said first portion in flow-increasing and flow-decreasing directions with respect to said fluid flow, means rendering said second portion ineffective to vary said fluid flow during predetermined initial movement of said first portion from its flow-preventing position, biasing means for said flow control means, a lost motion connection between said biasing means and said second portion operative in response to predetermined movement of said second portion with movement of said first portion during its said initial movement to afford force transmitting connection between said second portion and said biasing means to bias said first portion toward flow-preventing position with further movement thereof and to bias said second portion in flow-increasing direction with movement of said first portion beyond its said initial movement, and actuating means for said flow control means comprising pressure responsive means including a pressure chamber associated with each of said inlet and outlet chambers and responsive to a predetermined difference between the pressure in said inlet and pressure chambers to move said flow control means for predetermined initial movement of said first portion to permit fluid flow from said inlet chamber to said outlet chamber, and responsive to the difference in pressure between said outlet and pressure chambers to effect movement of said flow control means by said predetermined initial movement of said first portion for movement of said second portion in flow-decreasing direction against said biasing means for maintaining the pressure in said outlet chamber at a predetermined level in accordance with the force of said biasing means.

4. In a fluid flow control device, in combination, a valve member having flow-permitting and flow-preventing positions, a metering valve movable with said valve member and having a first position permitting fuel flow therepast and movable in a flow-decreasing direction, means for moving said valve member, movement of said valve member from flow-preventing to flow-permitting position affording predetermined fuel flow, further movement of said valve member in the same direction effecting movement of said metering valve in a flow-decreasing direction from said first position to a second position affording reduced fuel flow, and means comprising biasing means operable to urge said metering valve against movement in said flow-decreasing direction and including means rendering said biasing means ineffective during movement of said valve member between its flow-preventing and flow-permitting positions.

5. In a fluid flow control device, in combination, a unitary flow control structure comprising a valve member movable between flow-permitting and flow-preventing positions and a metering valve having a flow-permitting position and being movable in a flow-decreasing direction following movement of said valve member from its flow-preventing position to its flow-permitting position, means for moving said unitary flow control structure, and means comprising biasing means for said unitary flow control structure to urge said metering valve against movement in said flow-decreasing direction and including lost motion means rendering said biasing means ineffective during movement of said valve member between its said flow-permitting and flow-preventing positions.

6. In a fluid flow control device, in combination, a unitary flow control structure comprising a valve member movable between flow-permitting and flow-preventing positions and a metering valve having a flow-permitting position and being movable in a flow-decreasing direction following movement of said valve member from its flow-preventing position to its flow-permitting position, fluid pressure operated actuating means for said structure, and means comprising biasing means for said unitary flow control structure to urge said metering valve against movement in said flow-decreasing direction and including means rendering said biasing means ineffective during movement of said valve member between its said flow-permitting and flow-preventing positions by said fluid pressure operated actuating means.

7. In a fluid flow control device, in combination, a unitary flow control structure comprising a valve member movable between flow-permitting and flow-preventing positions and a metering valve having a flow-permitting position and being movable in a flow-decreasing direction following movement of said valve member from its flow-preventing position to its flow-permitting position, means for moving said unitary flow control structure, and means comprising biasing means for said unitary flow control structure to urge said metering valve against movement in said flow-decreasing direction and including lost motion connecting means between said biasing means and said flow control structure for rendering said biasing means ineffective to urge said structure to any position during movement of said valve member between its said flow-permitting and flow-preventing positions.

8. In a fluid flow control device, in combination, a unitary flow control structure comprising a valve member movable between flow-permitting and flow-preventing positions and a metering valve having a flow-permitting position and being movable in a flow-decreasing direction following movement of said valve member from its flow-preventing position to its flow-permitting position, means for moving said unitary flow control structure, adjustable biasing means for said flow control structure to urge said metering valve against movement in said flow-decreasing direction and said valve member toward its flow-preventing position, and lost motion connection means between said flow control structure and said biasing means to render said biasing means incapable of exerting a biasing effect on said valve member during movement thereof between its said flow-permitting and flow-preventing positions.

9. In a fluid flow control device, in combination, a valve member having flow-permitting and flow-preventing positions, a metering valve movable with said valve member and having a first position permitting fuel flow therepast and movable in a flow-decreasing direction, means for moving said valve member, movement of said valve member from flow-preventing to flow-permitting position affording predetermined fuel flow, further movement of said valve member in the same direction effecting movement of said metering valve in a flow-decreasing direction from said first position to a second position affording reduced fuel flow, and means comprising biasing means operable to urge said metering valve against movement in said flow-decreasing direction and including lost motion means rendering said biasing means ineffective during movement of said valve member between its said flow-preventing and flow-permitting positions.

10. A diaphragm valve for controlling fluid flow comprising in combination, a valve member having flow-permitting and flow-preventing positions, a metering valve movable with said valve member and having a first position permitting fuel flow therepast and movable in a flow-decreasing direction, pressure responsive valve actuating means including a diaphragm connected to move said valve member, movement of said valve member from flow-preventing to flow-permitting position affording predetermined fuel flow, further movement of said valve member in the same direction caused by an increase in the pressure of the fluid controlled effecting movement of said metering valve in a flow-decreasing direction from said first position to a second position affording reduced fuel flow, and means comprising biasing means operable to urge said metering valve against movement in said flow-decreasing direction and including means rendering said biasing means ineffective during movement of said valve member between its flow-preventing and flow-permitting positions.

11. A diaphragm valve for controlling fluid flow comprising in combination, a valve member having flow-permitting and flow-preventing positions, a metering valve movable with said valve member and having a first position permitting fuel flow therepast and movable in a flow-decreasing direction, pressure responsive valve actuating means including a diaphragm connected to move said valve member, movement of said valve member from flow-preventing to flow-permitting position affording predetermined fuel flow, further movement of said valve member in the same direction caused by an increase in the pressure of the fluid controlled effecting movement of said metering valve in a flow-decreasing direction from said first position to a second position affording reduced fuel flow, and means comprising biasing means operable to urge said metering valve against movement in said flow-decreasing direction and including lost motion means rendering said biasing means ineffective during movement of said valve member between its flow-preventing and flow-permitting positions.

12. An electroresponsive diaphragm valve for controlling fluid flow comprising in combination, a valve member having flow-permitting and flow-preventing positions, a metering valve movable with said valve member and having a first position permitting fuel flow therepast and movable in a flow-decreasing direction, pressure responsive valve actuating means including a diaphragm connected to move said valve member, electroresponsive pilot valve means for said actuating means, movement of said valve member from flow-preventing to flow-permitting position affording predetermined fuel flow, further movement of said valve member in the same direction caused by an increase in the pressure of the fluid controlled effecting movement of said metering valve in a flow-decreasing direction from said first position to a second position affording reduced fuel flow, and means comprising biasing means operable to urge said metering valve against movement in said flow-decreasing direction and including means rendering said biasing means ineffective during movement of said valve member between its flow-preventing and flow-permitting positions.

13. An electroresponsive diaphragm valve for controlling fluid flow comprising in combination, a valve member having flow-permitting and flow-preventing positions, a metering valve movable with said valve member and having a first position permitting fuel flow therepast and movable in a flow-decreasing direction, pressure responsive valve actuating means including a diaphragm connected to move said valve member, electroresponsive pilot valve means for said actuating means, movement of said valve member from flow-preventing to flow-permitting position affording predetermined fuel flow, further movement of said valve member in the same direction caused by an increase in the pressure of the fluid controlled effecting movement of said metering valve in a flow-decreasing direction from said first position to a second position affording reduced fuel flow, and means comprising biasing means operable to urge said metering valve against movement in said flow-decreasing direction and including lost motion means rendering said biasing means ineffective during movement of said valve member between its flow-preventing and flow-permitting positions.

References Cited in the file of this patent

UNITED STATES PATENTS

| | | |
|---|---|---|
| 209,638 | Adams | Nov. 5, 1878 |
| 2,746,471 | Cobb | May 22, 1956 |